United States Patent [19]

Meiller

[11] Patent Number: 4,657,305

[45] Date of Patent: Apr. 14, 1987

[54] SEAT WITH ADJUSTABLE ARMREST

[75] Inventor: Hermann Meiller, Amberg, Fed. Rep. of Germany

[73] Assignee: Grammer Sitzsystem GmbH, Fed. Rep. of Germany

[21] Appl. No.: 904,413

[22] Filed: Sep. 8, 1986

[30] Foreign Application Priority Data

Sep. 25, 1985 [DE] Fed. Rep. of Germany ....... 3534131

[51] Int. Cl.⁴ .............................................. A47C 7/54
[52] U.S. Cl. .................................... 297/417; 297/115; 297/411
[58] Field of Search ............... 297/417, 422, 411, 412, 297/115

[56] References Cited

U.S. PATENT DOCUMENTS

| 4,244,623 | 1/1981 | Hall et al. | 297/417 |
| 4,307,913 | 12/1981 | Spiegelhoff | 297/417 |
| 4,311,338 | 1/1982 | Moorhouse | 297/417 |
| 4,400,033 | 8/1983 | Pietsch | 297/417 |
| 4,496,190 | 1/1985 | Barley | 297/411 |

FOREIGN PATENT DOCUMENTS 3110515 11/1982 Fed. Rep. of Germany ...... 297/417

Primary Examiner—James T. McCall
Attorney, Agent, or Firm—Lerner, David, Littenberg, Krumholz & Mentlik

[57] ABSTRACT

In a seat comprising a seat portion, a backrest portion which is adjustable in inclination relative to the seat portion, and first and second adjustable armrests at respective sides of the seat, each armrest is connected to a fixing element for fixing it to a mounting element carried on the seat portion. By disposing the mounting element on the seat portion the position of the respective armrest is independent of the inclination of the backrest portion. A connecting element connects the fixing element to the mounting element in such a way as to provide for adjustment in respect of height of the armrest and/or so as to permit pivotal movement of the armrest about an axis extending transversely with respect to the seat.

8 Claims, 10 Drawing Figures

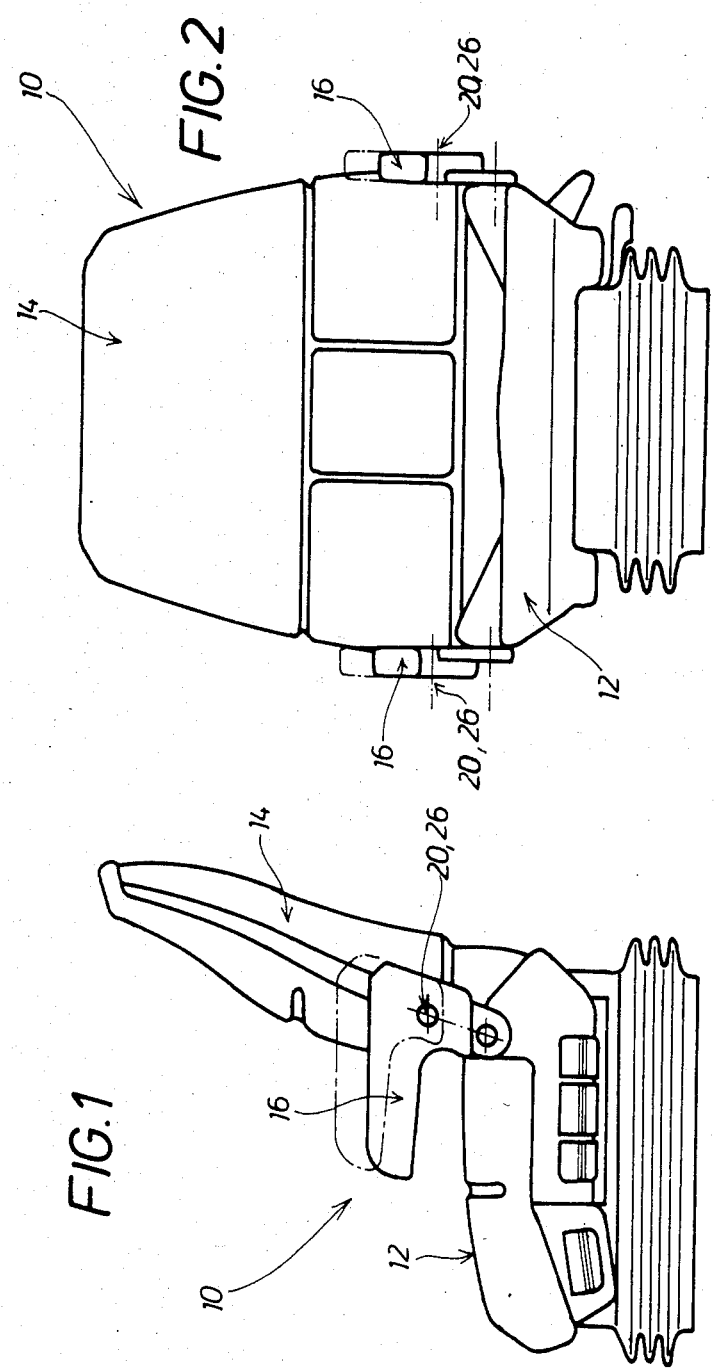

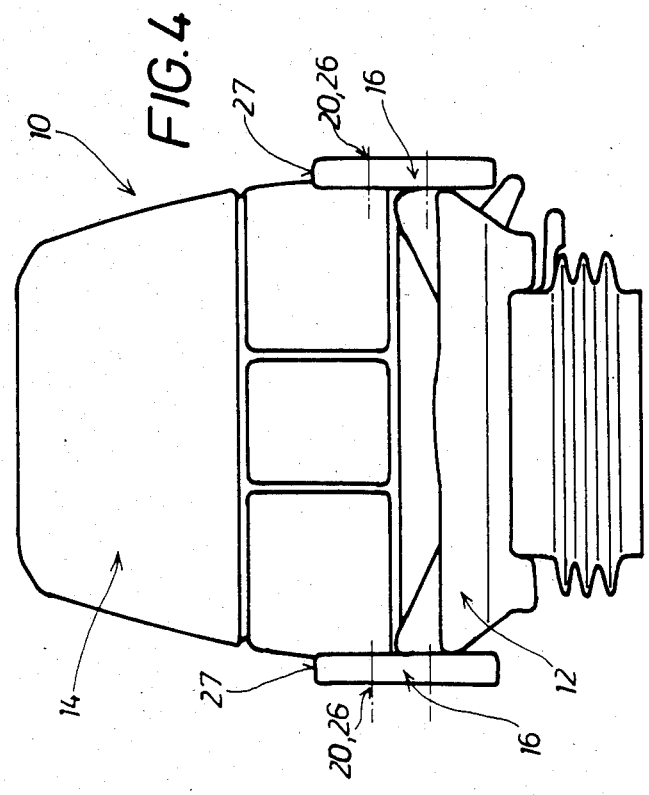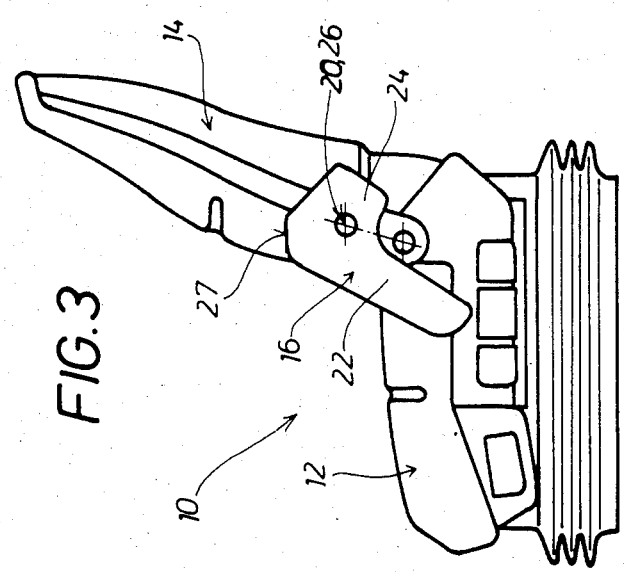

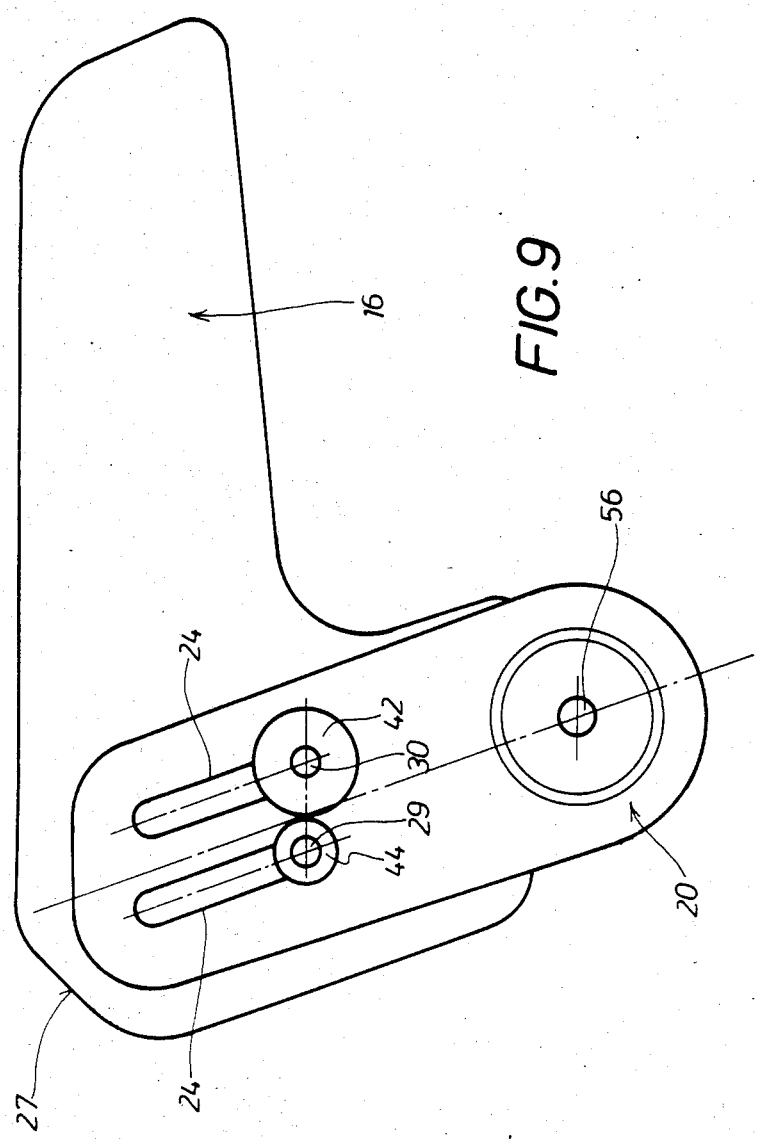

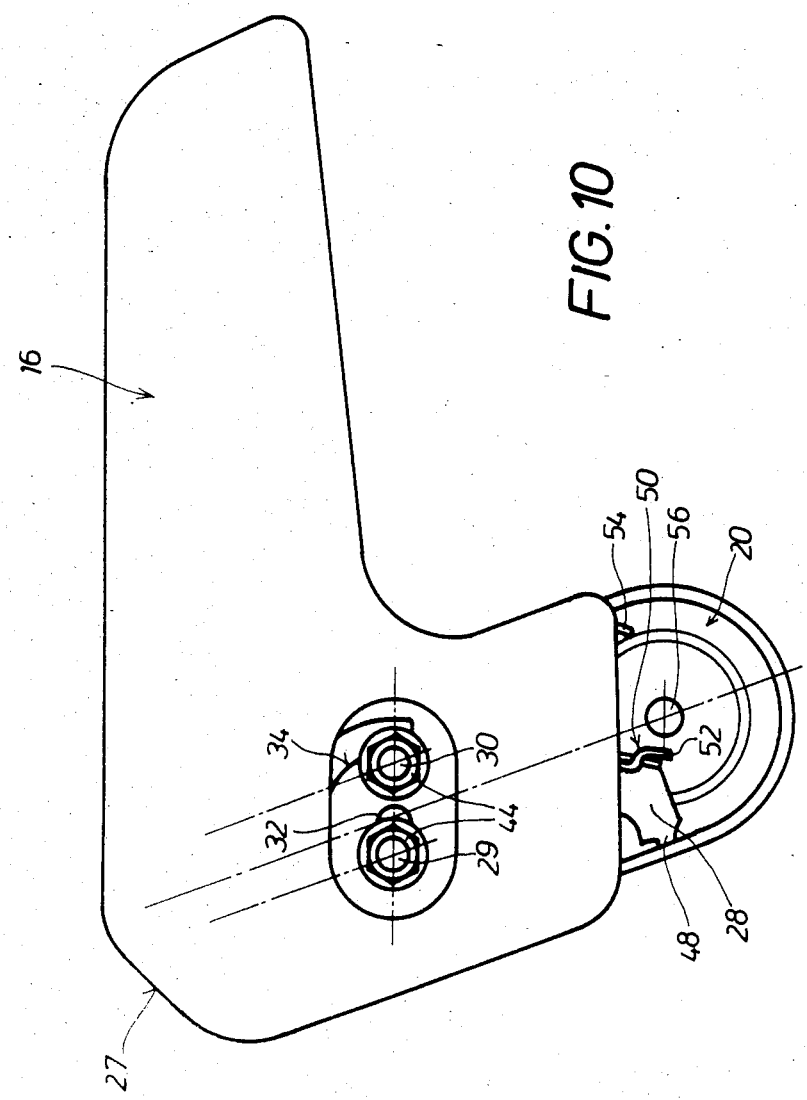

SEAT WITH ADJUSTABLE ARMREST

BACKGROUND OF THE INVENTION

Many kinds of seat, for example for not exclusively those which are designed to be used for instance in aircraft, boats and the like comprise a seat or squab portion, a backrest portion which is adjustable in inclination relative to the seat portion, and adjustable armrests which are disposed beside the backrest portion, with each armrest having a respective fixing element for fixing it to a mounting element which is in turn carried on a suitable part of the seat. In such a seat, the mounting elements may be provided on the adjustable backrest portion, so that the armrests are secured to the backrest portion itself. In such a seat design, the armrests may be adjustable in respect of height and they may also be arranged to be pivotable about an axis which extends through the mounting element and the fixing element by means of which they are secured in position on the seat.

However, the seat design configuration suffers from the disadvantage that the position of the armrests is dependent on the adjusted angle of inclination of the backrest. Accordingly, if the occupant of the seat adjusts the angle of the backrest portion, it is then necessary to re-adjust the armrests to restore them to the position to which they had originally been set, prior to the adjustment to the angle of the backrest portion. It is frequently found that restoring the armrests to their correct original position as desired by the occupant of the seat not only requires the angle of inclination of the armrests relative to the seat portion to be altered in a suitable fashion, but it further requires adjustment to the armrests to restore them to the correct height in relation to the surface of the seat portion.

In such seats therefore adjustability of the armrests in respect of height above the surface of the seat portion is also based on the necessity that, when the angle of inclination of the backrest is changed, besides the resultingly changing angle of inclination of the armrests, the height of the armrests must also be adjusted.

SUMMARY OF THE INVENTION

An object of the present invention is to provide a seat having armrests which are adjustable independently of the position of the backrest portion of the seat.

Another object of the present invention is to provide a seat in which armrests can be easily adjusted both in respect of their angular position and in respect to their height above the sitting surface of the seat, independently of inclination adjustment of the backrest portion of the seat.

Still another object of the present invention is to provide a seat having adjustable armrests which can be displaced into positions in which they do not seriously interfere wtih entry to or exit from the seat.

A further object of the present invention is to provide a seat having armrests which are mounted to the seat in a secure and strong fashion.

Yet a further object of the present invention is to provide a seat with adjustable backrest and adjustable armrests, in which adjustment thereof can be effected in a simple manner.

In accordance with the principles of the present invention, those and other objects are achieved by a seat comprising a seat portion and a backrest portion which is adjustable in respect of its angle of inclination relative to the seat portion. The seat further comprises adjustable armrests at each side of the seat. Each armrest is connected to a fixing element for fixing it to a mounting element. The respective mounting element is disposed or mounted on the seat portion and is connected to the fixing element of the respective armrest by means of two fixedly interconnected pins. The pins are jointly displaceable for adjustment of the respective armrest in respect of height relative to the fixing element, and/or one of the pins, for pivotal movement of the respective armrest, is held immovably relative to the fixing element while the other pin is guided in an arcuate path around the one pin.

Arranging the mounting element on the seat portion gives the advantage that the respective armrest is not secured to the backrest portion of the seat but instead is secured to the seat portion itself. The fact that the mounting element secured to the seat portion is connected to the fixing element, by means of first and second pins which are displaceable with a linear movement relative to the fixing element and/or which are guided in such a way that, upon pivotal movement of the respective armrest, the one pin moves along an arcuate path around the other pin which thus remains stationary during such pivotal movement of the armrest, gives the advantages that adjustment in respect of height and/or inclination of the armrest is independent of the angle of inclination of the backrest portion, and that the armrest can be folded out of the way, for example to permit easy entry or egress into or out of the seat, with the armrest in any position in respect of height thereof.

In an advantageous embodiment, the mounting element may have first and second longitudinal slots which extend in at least substantially parallel and juxtaposed relationship in the direction in which the respective armrest is adjustable in height. The fixing element may have first and second slots of which one slot is a rectilinear slot while the other slot comprises a first arcuate slot portion and a second straight slot portion which is disposed at one end of the arcuate slot portion and which is towards the first slot. The first and second slots in the mounting element and the first and second slots in the fixing element have common overlapping portions, while the first and second pins are provided on a connecting element disposed between the respective mounting element and fixing element. At the overlapping portions referred to above, in the respective slots, the first and second pins extend through the slots in the mounting element and the slots in the fixing element. The mounting element carried on the seat portion is mechanically fixedly connected to the fixing element on the respective armrest by means of the first and second pins. For that purpose, at their oppositely disposed end portions, the pins may be provided with screwthreads on to which screwthreaded nuts are screwed. Alternatively however it is also possible for a disc or washer or like retaining member to be fixed as by welding on one end portion of each pin, with only the oppositely disposed end portion of the respective pin being provided with a screwthread on to which a screwthreaded nut is then screwed. The pins which are disposed on the respective connecting element are displaceable along the slots which are provided in the mounting element and which, as mentioned, extend in the direction in which the armrest is adjustable in respect of height, whereby the armrest can be adjusted in height in a virtually play-free manner. By virtue of the configuration of the fixing element with first and second slots of the respective configurations outlined above, the armrest can be pivoted between a position in which it is at least approximately horizontal, and a position in which it is pivoted or folded downwardly relative to the seat portion, with one pin on the connecting element being guided by the first rectilinear slot and the second pin being guided in the arcuate slot portion. It should be noted that, in order for the pivotal movement of the armrest to occur substantilly without play, the cross-sectional dimensions of the pins are adapted to the contours of the respective slots, that is to say the widths of the slots in the fixing element.

The first slot which, as mentioned, is a rectilinear slot, and the second straight portion at one end of the second arcuate slot portion of the second slot in the fixing element are preferably aligned with each other, with the centre of the curvature of the arcuate slot portion preferably being disposed in the end region of the first slot which faces towards the second straight portion of the second slot. That configuration of the seat in accordance with the principles of the present invention provides on the one hand for secure positioning of the armrest in the horizontal position thereof, and on the other hand ease of pivotally insofar as the armrest is firstly displaced with a linear movement over a small distance such that the pin which is disposed in the second straight portion of the second slot moves out of that slot and is then movable along the first arcuate portion of the second slot. At the same time, the second of the pins provided on the respective connecting element is disposed at the end region of the first slot, being the end region which is towards the second straight portion of the second slot, whereby the armrest can be pivoted about said second pin which thus acts as the pivot point thereof.

In another preferred embodiment of the seat in accordance with the present invention, the connecting element is preferably disposed between the fixing element on the armrest and the mounting element on the seat portion. The first and second pins of the respective armrest assembly extend away from respective sides of the connecting element in mutually opposite directions and extend through the slots in the fixing element and in the mounting element respectively. Such a configuration affords the advantage that the connecting element, the mounting element and the fixing element, with the first and second pins, take up only a relatively small amount of space.

Another considerable advantage of that configuration of the seat according to the invention is that the connecting element is guided between the fixing element and the mounting element over a substantial surface area, the assembly thus preventing tilting of the pins which extend through the respective slots. In that way the armrest can be easily adjusted in respect of height and/or in respect of its angle of inclination.

In another embodiment of the invention, the mounting element of the respective armrest of the seat according to the invention may having openings which are spaced from each other, while the connecting element may have a detent or locking means as in the form of a projection which is engageable into a respective selected one of the openings. A first spring member may be disposed between the connecting element and the mounting element, to urge the detent projection into its position of engagement in one of the openings in the mounting element. The space-apart openings in the mounting element are disposed in a line extending in the direction in which the armrest is adjustable in respect of height. They may be disposed at a relatively small spacing from each other so that the armrest can accordingly be adjusted in height, in a series of relatively small steps or graduations. The first spring member which is disposed between the connecting element and the mounting element may be a spring of a generally loop-like configuration having a first limb with an end portion thereof fixed to the connecting element and a second limb having the end portion thereof bearing against the mounting element in contact therewith. In an aspect of the invention, the mounting element may be in the form of an elongate dish-like member having a peripheral flanged-over edge portion, with the end portion of the second limb of the first spring member bearing in rubbing contact against the flanged edge portion of the mounting element. The connecting element is in that way positively actuated by means of the first spring member in such a way that the detent projection on the connecting element is guaranteed at any time to engage reliably into a selected one of the openings in the mounting element, while such engagement of the detent projection into one of the openings can only be released by a deliberate and intentional movement of the armrest for the purposes of height adjustment thereof.

Another aspect of the invention provides that disposed between the connecting element and the mounting element of the respective armrest assembly is a second spring member which is mechanically stressed when the armrest is pivoted from its horizontal position into its folded-away position. The second spring member is disposed between the connecting element and the mounting element in such a way that it is in a substantially non-stressed condition when the armrest is in the horizontal position, but is then put under a mechanical stress when the armrest is moved into its inoperative position in which it is pivoted downwardly. The second spring member therefore serves to assist with the movement of the armrest for restoring it from its folded-down position into its horizontal position of use.

In an advantageous construction in accordance with the invention, the respective armrest is of a generally L-shaped configuration having first and second limb portions, while at the junction between the first and second limb portions of the armrest, on the outside of the L-shape, the armrest provides a flat surface portion which is disposed at least substantially horizontally when the armrest is in its inoperative position of being folded down towards the seat portion of the seat. That flat surface portion at the junction between the first and second limbs of the substantially L-shaped armrest gives the advantage that in the folded-away position the armrest gives a substantial amount of freedom for movement of the respective elbow of the occupant of the seat, while on the other hand the flat surface portion is available for additionally supporting the lower arm of the occupant of the seat, when the armrest is folded down.

Further objects, features and advantages of the present invention will be apparent from the following description of a preferred embodiment.

BRIEF DESCRIPTION OF THE DRAWINGS

FIG. 1 is a side view of a seat showing one of the armrests thereof in the operative position in which it is pivoted upwardly and is disposed substantially horizontally, FIG. 2 is a front view of the seat shown in FIG. 1, FIG. 3 is a view corresponding to that shown in FIG. 1 but illustrating the armrest in the downwardly folded position, FIG. 4 is a front view of the seat shown in FIG. 3, FIG. 9 is a view of the mounting element and the armrest connected thereto, viewing in the direction indicated by the arrow IX in FIG. 5, and FIG. 10 is a view of the armrest viewing in the direction indicated by the arrow X in FIG. 5.

DESCRIPTION OF THE PREFERRED EMBODIMENT

Figure 5:
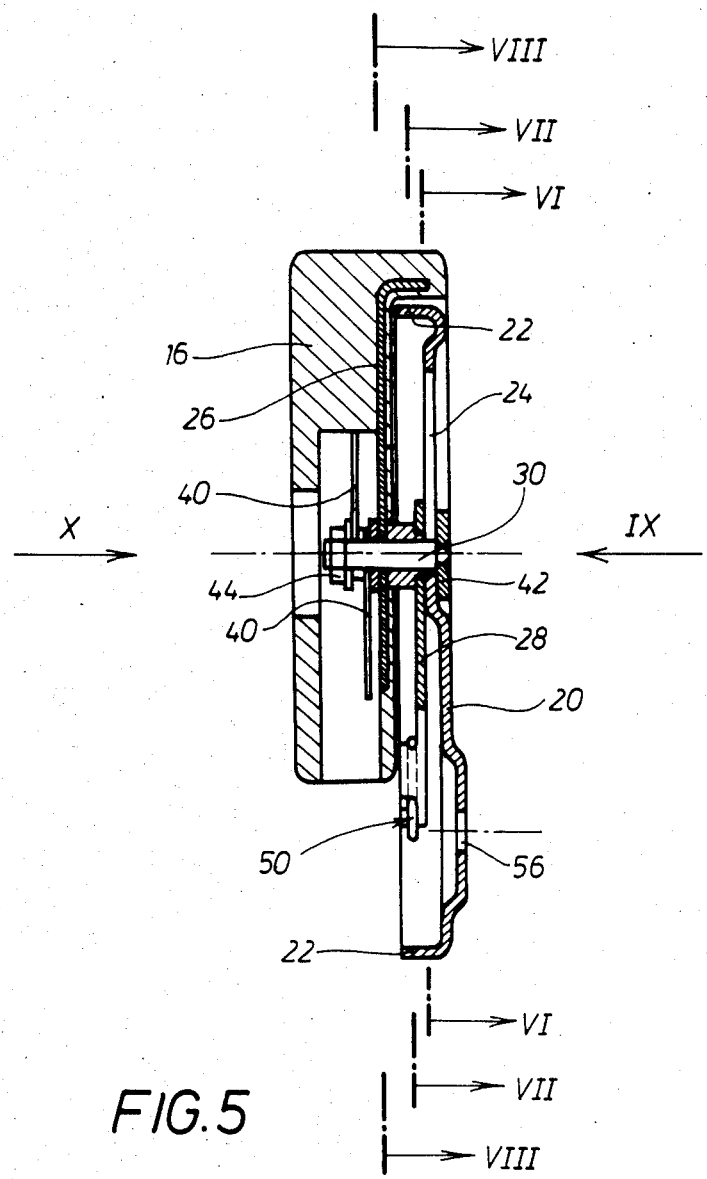
FIG. 5 is a view in longitudinal section through an armrest with fixing element which is connected by means of a connecting element bearing pins, to a mounting element which is adapted to be fixed to a seat portion of the seat.

Reference will first be made to FIGS. 1 through 4 which show views generally of a seat in accordance with the present invention.

Thus, looking at FIGS. 1 and 2, shown therein is an embodiment of a seat as indicated generally by reference numeral 10, comprising a seat squab portion 12, a backrest portion 14 which is adjustable in respect of its angle of inclination relative to the seat portion 12, and armrests 16 which are disposed at respective sides of the seat and which project laterally forwardly of the backrest portion 14. Solid lines are used in FIGS. 1 and 2 to show one of the armrests 16 in a first horizontal position while dash-dotted lines are used to illustrate the armrest 16 in a second horizontal position which is set at a greater height relative to the surface of the seat portion 12 than the first horizontal position shown in solid lines.

For the purposes of mounting it in position, each armrest 16 has a fixing element 26 connected thereto, for fixing to a mounting element 20 which is provided on the seat 10, more specifically on the seat portion 12 thereof. The elements 20 and 26 are represented in FIG. 1 by a circle while in FIG. 2 they are indicated in diagrammatic form by short dash-dotted line representing the axis of pivotal movement defined by the element 20 and 26. The detailed construction of the respective elements 20 and 26 will be described in greater detail hereinafter with reference more specifically to FIGS. 6 through 8.

As indicated, the mounting element 20 is disposed on the seat portion 12 with the result that the armrest 16 which, as can be clearly seen for example from FIG. 1, is of a substantially L-shaped configuration, can be adjusted both in respect of height above the surface of the seat portion 12 and also in respect of its angle of inclination relative to the seat portion 12, independently of the inclination of the backrest portion 14.

Referring now to FIGS. 3 and 4, the armrest 16 is shown therein in an inoperative position in which it is folded away by pivoting downwardly about the axis defined by the respective elements 20 and 26. That therefore provides space for movement of the elbow of the occupant of the seat. It will be seen that, in the transitional region between the limb portions 22 and 24 of the L-shaped armrest 16, on the outside surface of the L-configuration, the armrest 16 has a flat surface portion 27 which is at least approximately horizontal in the folded-down position of the armrest as illustrated in FIG. 3. In that position of the armrest 16 the surface portion 27 provides support for the lower arm of the occupant of the seat, at that side of the seat. It will be appreciated that identical parts of the seat 10 are denoted by the same reference numerals in FIGS. 3 and 4, as referred to above in FIGS. 1 and 2.

Figure 6:
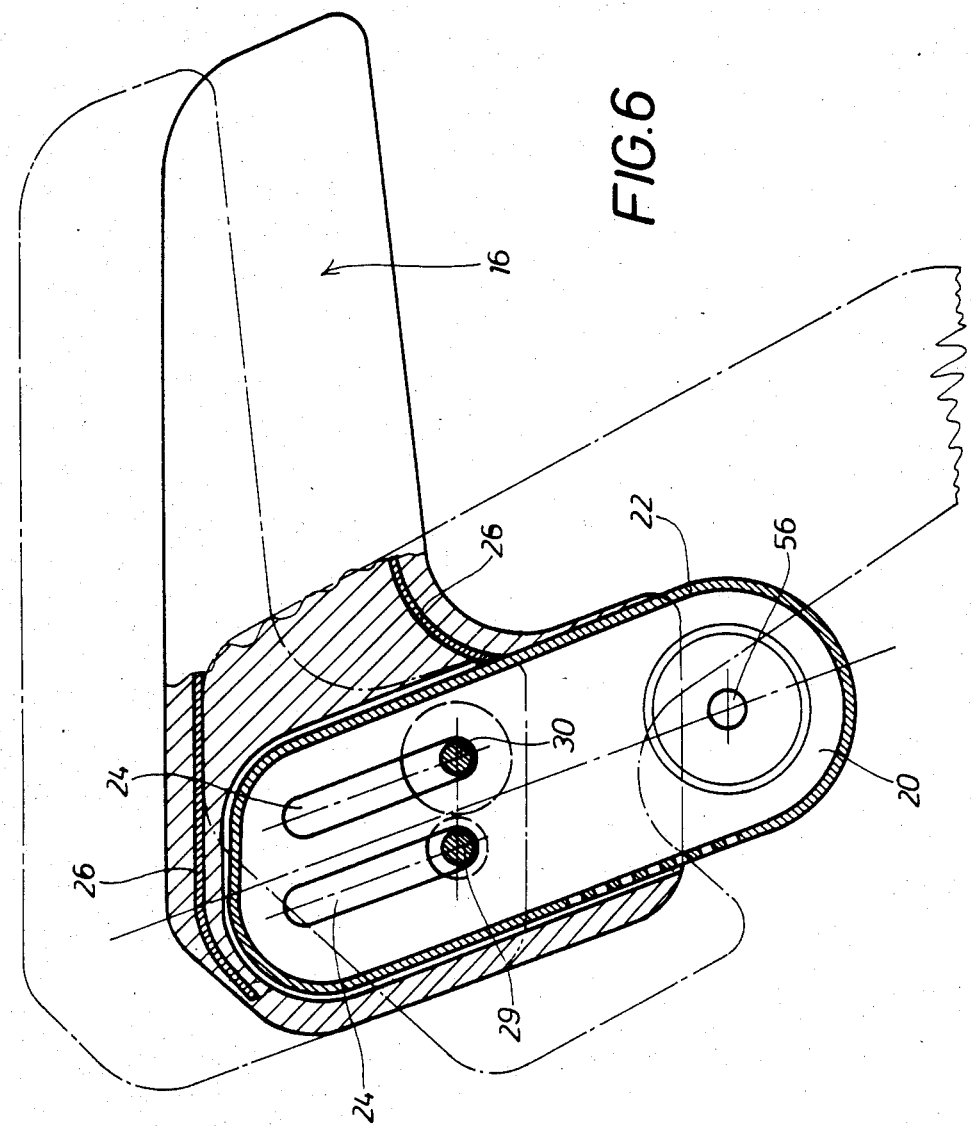
FIG. 6 is a view in section taken along line VI—VI in FIG. 5, extending between the mounting element and the connecting element therein.

Reference will now be made generally to FIGS. 5 through 8 showing various views of the structure by means of which the armrest 16 is mounted to the seat portion 12 of the seat 10. Thus FIG. 6 shows a side view of the mounting element 20 which is carried on the seat portion 12 (as shown for example in FIG. 1) and which is in the form of an elongate flat element having a peripheral flanged-over edge portion defining a flange as indicated at 22 in both FIGS. 5 and 6. The mounting element 20 thus is in the form of a shallow generally dish-like component. The mounting element 20 has first and second slots indicated at 24 in FIG. 6, which extend in at least substantially parallel and juxtaposed relationship, in the direction in which the armrest is to be adjustable in respect of height.

The mounting element 20 is connected by means of a connecting element 28 to the fixing element 26 which is carried by the armrest 16, as described above with reference to FIGS. 1 through 4. The connecting element 28 which can be seen from FIG. 5 to be disposed between the mounting element 20 and the fixing element 26 and whose general outline configuration can be seen in FIG. 7 carries first and second pins indicated at 29 and 30 for example in FIGS. 6 and 7. One of the pins, as indicated at 30, can be seen also in FIG. 5. The pins 29 and 30 extend through the connecting element 28 and project away from respectively oppositely disposed sides thereof in mutually opposite directions.

Figure 8:
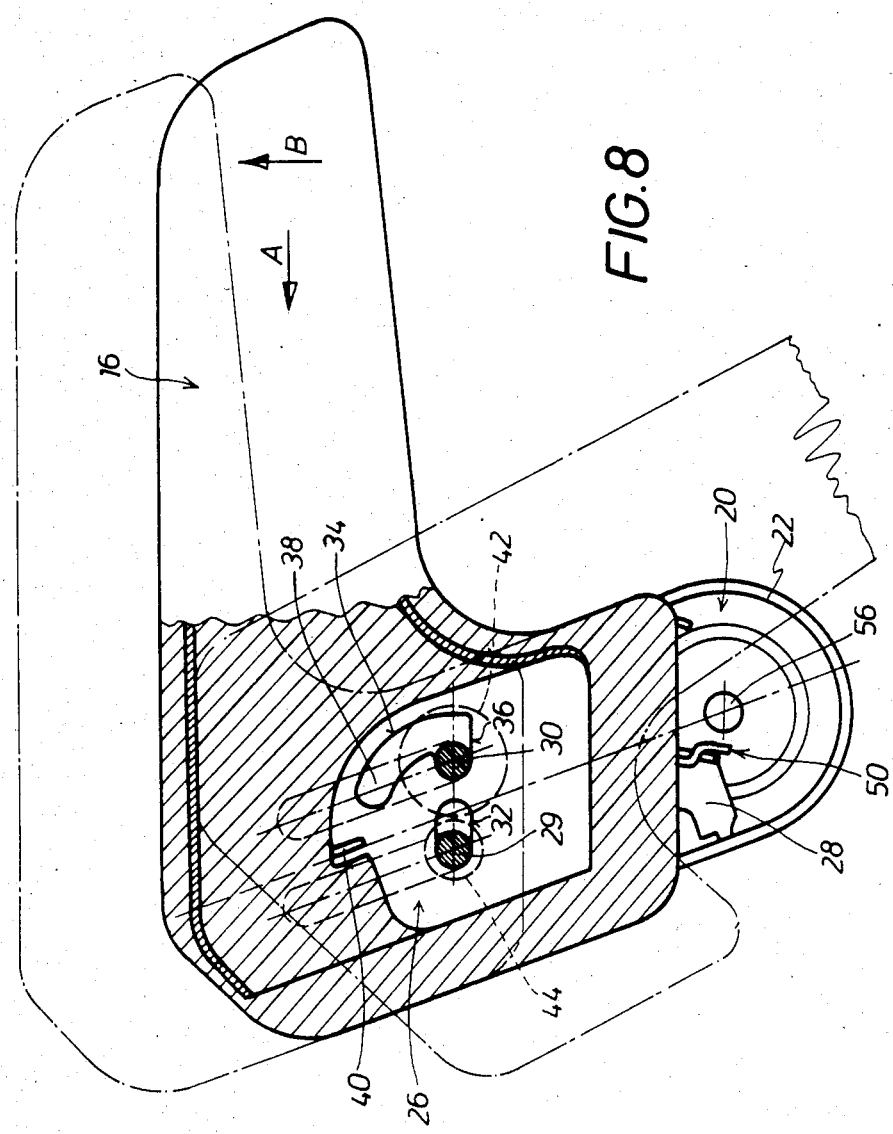
FIG. 8 is a view in section taken along line VIII—VIII in FIG. 5, extending directly beside the fixing element therein.

Looking now at FIG. 8, it will be seen therefrom that the fixing element 26 has first and second slots 32 and 34 which are disposed adjacent each other. The first slot 32 is a substantially rectilinear slot and is so disposed that it extends at least substantially horizontally when the armrest 16 is in a horizontal position. The second slot 34 can be seen from FIG. 8 to comprise a first arcuate slot portion and, communicating therewith, a second rectilinear slot portion as indicated at 26. The slot portion 36 is thus disposed at one end, being the lower end in FIG. 8, of the arcuate portion of the slot 34, and is directed towards the first slot 32 in such a way that the first slot 32 and the second portion of the slot 34 are disposed horizontally opposite to each other, in the horizontal position of the armrest 16.

The two slots 24 in the mounting element 20 and the two slots 32 and 34 in the fixing element 26 have common overlapping portions. The two pins 29 and 30 on the connecting element 28 extends at the overlapping portions through the slots 24 in the mounting element 20 and through the slots 32 and 34 on the fixing element 26. The first slot 32 and the rectilinear slot portion 36 of the second slot 34 at one end thereof are in alignment with each other and the centre of curvature of the arcuate portion of the slot 34 is disposed in the end region of the first slot 32, which is towards the slot portion 36.

For the purposes of pivotal movement of the armrest 16 between the horizontal position shown in solid lines in FIG. 8 and the folded-away, downwardly pivoted position shown in dash-dotted lines in FIG. 8, the armrest 16 is displaced towards the left in FIG. 8 relative to the mounting element 20, in the direction indicated by the arrow A, whereby the pins 29 and 30 are in effect moved towards the right in FIG. 8 relative to the slots 32 and 34 until the pin 30 is disposed in line with the arcuate portion of the slot 34 and the pin 29 is at least substantially towards the end of the slot 32 which is towards the right in FIG. 8. The armrest 16 can thus be pivoted downwardly about the pin 29 until the pin 30 comes to bear against the upper end face as indicated at 38 in FIG. 8, of the arcuate portion of the slot 34. At the same time as the armrest 16 is pivoted from its horizontal position into its downwardly folded-away position, a spring member 40 which, as shown in FIG. 5, is disposed between the connecting element 28 and the mounting element 20, is put under tension. Just an end portion of the spring element 40 can be seen in FIG. 8. When the spring element 40 is tensioned in that way, in the downwardly pivoted position of the armrest 16, it assists with the return movement for mvoing the armrest 16 from its folded-away position upwardly into its horizontal position of use.

It will be clearly seen from FIG. 5 that the connecting element which is for example in the form of a flat stamped component is disposed between the fixing element 26 and the mounting element 20. FIG. 5 shows only the pin 30 which, like the other pin 29, projects away from both sides of the connecting element 28 in mutually opposite directions. The pins 29 and 30 thus extend through the slots 32 and 34 in the fixing element 26 and through the slots 24 in the mounting element 20, which are accordingly disposed on respective sides of the connecting element 28.

A respective retaining member such as a disc or washer as at 42 in for example FIGS. 5 and 9 is secured as by welding to one end of each pin 29 and 30, which has passed through the respective slot 24 in the mounting element 20. The washer 42 is shown for example in FIG. 5 on the right-hand side therein of the mounting element 20. The opposite second end of each pin 29 and 30 is provided with a screwthreaded projection portion on to which a respective screwthreaded nut 44 is screwed. The nut 44 can be seen in FIG. 5 on the left-hand side of the fixing element 26, while both nuts 44 are to be seen in FIG. 10.

Figure 7:
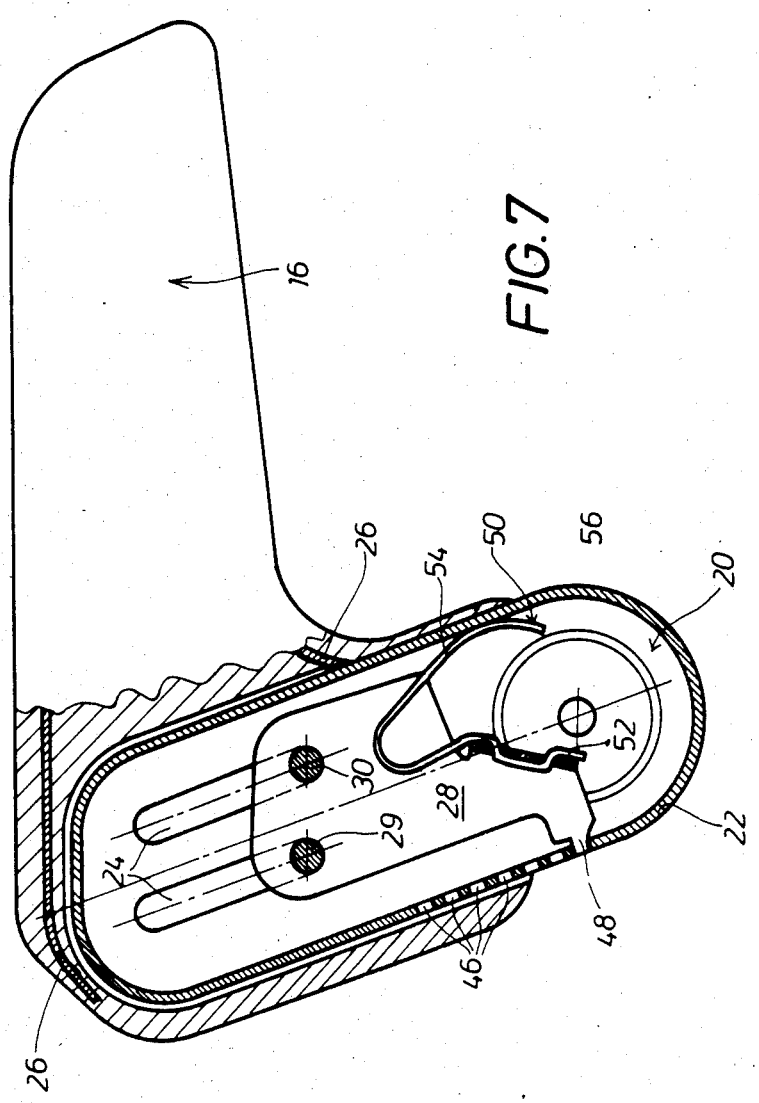
FIG. 7 is a view in section taken along line VII—VII in FIG. 5, extending laterally beside the connecting element therein.

Reference will now be made to FIG. 7 which shows that in its flanged-over edge portion 22 the mounting element 20 has a plurality of detent or locking means in the form illustrated as openings 46 which are disposed at a spacing from each other and which extend in a line adjacent to each other in the direction in which the armrest 16 is to be adjustable in respect of height. FIG. 7 likewise shows that the connecting element 28 has a detent means in the form of a projection 48 thereon, which is capable of engaging into a selected one of the openings 46. A spring element 50 is disposed between the connecting element 28 and the mounting element 20, to urge the connecting element 28 in such a direction as to cause the detent projection 48 to engage into a selected one of the openings 46, which is the condition of the arrangement shown in FIG. 7. The spring element 50 is in the form of a generally loop-like spring having a first limb with an end portion 52 thereof secured to the connecting element 28, and a second limb having an end portion 54 thereof bearing resiliently and in rubbing contact against the edge flange portion 22 of the mounting element 20.

For the purposes of adjusting the armrest 16 in its height relative to the surface of the seat portion 12, the horizontal limb portion of the armrest 16 is lifted in the direction indicated by the arrow B in FIG. 8, whereby the pin 30 which is disposed in the straight slot portion 36 of the slot 34 performs a small rotary movement about the pin 29 which is disposed in the first straight slot 32.

At the same time, the detent projection 48 shown in FIG. 7 performs a corresponding rotary movement about the pin 29 whereby the detent projection 48 comes out of engagement with the respective opening 46 and the armrest 16 can then be adjusted in respect of height by displacement in the direction of elongation of the slots 24 as clearly seen in FIG. 6. When the armrest 16 has been moved to the desired height, the armrest 16 is released again so that the spring element 50 causes the connecting element 28 with its detent projection 48 to pivot again about the pin 29 so that the detent projection 48 engages once again into the corresponding detent opening 46, at the new adjusted level of the armrest.

Reference will now be made to FIG. 9 showing a side view of the elongate dished mounting element 20 with its two slots 24 through which extend the pins 29 and 30. FIG. 9 also shows the discs or washers 42 which are secured as by welding to the ends of the pins 29 and 30, with the traverse dimensions or diameters of the discs 42 being larger than the transverse dimension of the slots 24. Reference numeral 56 in FIG. 9 denotes a bore in the mounting element 20. FIG. 9 again indicates by reference numeral 16 the armrest which is clearly visible as being of a substantially L-shaped configuration, with its flat surface portion 27 between the outside surfaces of the two limb portions of the armrest, in the region of the junction therebetween. As mentioned above, in the downwardly folded position of the armrest, the surface portion 27 can serve to support a part of the lower arm of the occupant of the seat, by being in a horizontal position.

Reference is now made to FIG. 10 showing the armrest 16 from the other side from the view shown in FIG. 9. FIG. 10 again shows the L-shaped configuration of the armrest 16 with its two limb portions and the surface portion 27 therebetween, together with the mounting element 20 having the bore 56 therein. FIG. 10 shows the detent projection 48 on the connecting element 28, together with the forward end of the connecting element 28 itself. The end portions 52 and 54 of the spring element 50 can just be seen in FIG. 10, below the lower edge of the body of the armrest 16, while also shown are the nuts 44 on the respective pins 29 and 30 for holding the assembly appropriately together.

It will be appreciated that the foregoing construction was described solely by way of example of the teachings of the present invention and that various modifications and alterations may be made therein without thereby departing from the spirit and scope of the invention.

What is claimed is:

1. A seat comprising a seat portion, a backrest portion mounted so as to be pivotably adjustable with respect to said seat portion, adjustable armrest means, and armrest mounting means for mounting said armrest means with respect to said seat portion and said backrest portion, said armrest mounting means comprising fixing means slidably mounted on said armrest, said fixing means being slidable in a predetermined direction in which said armrest means is adjustable and including a first fixing means slot and a second fixing means slot, said first fixing means slot comprising a substantially linear slot and said second fixing means slot comprising a substantially linear slot portion and a substantially arcuate slot portion contiguous therewith, mounting means connected to said seat portion, said mounting means including a first mounting means slot and a second mounting means slot, said first and second mounting means slots being parallel to each other and extending in said predetermined direction in which said armrest means is adjustable, first pin means extending through said first fixing means slot and said first mounting means slot, and second pin means extending through said second fixing means slot and said second mounting means slot, and connecting means carrying said first and second pin means in a fixed relationship with respect to each other, whereby said armrest means is adjustable in a first mode by pivoting said armrest means about said first pin means from a first operating position to a second rest position whereby said first pin means remains in a substantially fixed position within said first fixing means slot and said second pin means moves through said substantially arcuate slot portion of said second fixing means slot, and said armrest means is adjustable in a second mode in which said second pin means is located in said substantially linear slot portion by simultaneously sliding said first and second pin means in said first and second mounting means slots in said predetermined direction, thereby simultaneously slidably carrying said fixing means therewith.

2. A seat according to claim 1, wherein said first fixing means slot and said substantially linear slot portion of said second fixing means slot are substantially in alignment with each other.

3. A seat according to claim 2, wherein said first fixing means slot includes a first end and a second end, said second end of said first fixing means slot being proximate to said substantially linear slot portion of said second fixing means lot, and said first pin means being slidable between said first and second ends of said first fixing means slot, said substantially arcuate slot portion of said second fixing means slot having a center of curvature which is located at said second end of said first fixing means slot.

4. A seat according to claim 1, wherein said connecting means is disposed between said fixing means and said mounting means, and wherein said first and second pin means extend from both sides of said connecting means.

5. A seat according to claim 1, wherein said mounting means includes a plurality of mounting means apertures, and wherein said connecting means includes detent projection means selectively engageable with selected ones of said plurality of mounting means apertures, so as to adjust said armrest means into a plurality of selected positions in said second mode.

6. A seat according to claim 5, including second mode spring means operatively disposed between said mounting means and said connecting means so as to urge said detent projection means of said connecting means into said selected one of said plurality of mounting means apertures.

7. A seat according to claim 1, including first mode spring means operatively disposed between said mounting means and said connecting means so as to be subjected to stress when said armrest means is pivoted towards said second rest position about said first pivot means in said first mode so as to urge said armrest means back to said first operating position.

8. A seat according to claim 1, wherein said armrest means has a substantially L-shaped configuration including a rest portion which projects substantially horizontally when said armrest means is in said first operating position, a lower limb portion projecting therefrom, and a transition portion therebetween, wherein said transition portion includes a substantially planar surface which is disposed substantially horizontally when said armrest means is in said second rest position.

* * * * *

UNITED STATES PATENT AND TRADEMARK OFFICE
CERTIFICATE OF CORRECTION

PATENT NO. : 4,657,305

DATED : April 14, 1987

INVENTOR(S) : HERMANN MEILLER

It is certified that error appears in the above-identified patent and that said Letters Patent is hereby corrected as shown below:

Column 1, line 22, "the" should read --that--.
Column 1, line 50, "to" should read --of--.
Column 1, line 57, "wtih" should read --with--.
Column 3, line 10, "stantilly" should read --stantially--.
Column 3, line 25, "pivotally" should read --pivotability--.
Column 3, line 29, after "slot" insert --portion--.
Column 6, line 49, "26" should read --36--.
Column 6, line 53, after "portion" insert --36--.
Column 6, line 59, "extends" should read --extend--.
Column 7, line 22, "mvoing" should read --moving--.
Column 10, line 2, "lot" should read --slot--.

Signed and Sealed this

Twenty-ninth Day of September, 1987

Attest:

DONALD J. QUIGG

Attesting Officer

Commissioner of Patents and Trademarks